US008780692B2

(12) United States Patent
Patel et al.

(10) Patent No.: US 8,780,692 B2
(45) Date of Patent: Jul. 15, 2014

(54) ACCELERATED ROUTING CONVERGENCE

(75) Inventors: Keyur Patel, San Jose, CA (US); Enke Chen, San Jose, CA (US); Rex Fernando, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 224 days.

(21) Appl. No.: 13/166,700

(22) Filed: Jun. 22, 2011

(65) Prior Publication Data

US 2012/0269198 A1  Oct. 25, 2012

Related U.S. Application Data

(60) Provisional application No. 61/478,758, filed on Apr. 25, 2011.

(51) Int. Cl.
*H04L 12/26* (2006.01)
*H04L 12/28* (2006.01)
*G06F 15/177* (2006.01)

(52) U.S. Cl.
USPC ........... 370/216; 370/400; 709/220; 709/222; 709/227

(58) Field of Classification Search
None
See application file for complete search history.

(56) References Cited

U.S. PATENT DOCUMENTS

| | | | | |
|---|---|---|---|---|
| 6,553,423 B1 * | 4/2003 | Chen | ....................... | 709/230 |
| 6,567,380 B1 * | 5/2003 | Chen | ....................... | 370/238 |
| 8,320,361 B2 * | 11/2012 | Mohapatra et al. | ........... | 370/351 |
| 2002/0009072 A1 * | 1/2002 | Halme | ....................... | 370/352 |
| 2006/0171404 A1 * | 8/2006 | Nalawade et al. | ........... | 370/401 |
| 2007/0165543 A1 * | 7/2007 | Joo | ................. | 370/254 |
| 2008/0031239 A1 * | 2/2008 | Kapoor et al. | ................. | 370/389 |
| 2008/0089231 A1 * | 4/2008 | Appanna et al. | ............. | 370/235 |
| 2008/0089348 A1 * | 4/2008 | Appanna et al. | ............. | 370/401 |
| 2009/0097489 A1 * | 4/2009 | Li et al. | ..................... | 370/395.31 |

OTHER PUBLICATIONS

Graceful Restart Mechanism for BGP—Jan. 2007—Sangli et al.*
Route Refresh Capability for BGP-4—Sep. 2000—Chen.*
Scudder, J. et al., "Capabilities Advertisement with BGP-4", Request for Comments: 5492, Network Working Group, Feb. 2009, 8 pages.
Bates, T. et al. "Multiprotocol Extensions for BGP-4", Request for Comments, 4760, Network Working Group, Jan. 2007, 12 pages.
Sangli, S. et al., "Grace Restart Mechanism for BGP", Request for Comments, 4724, Network Working Group, Jan. 2007, 15 pages.
Rekhter Y., et al., "A Border Gateway Protocol 4 (BGP-4)"., Request for Comments, 4271, Network Working Group, Jan. 2006, 98 pages.
Chen, E., "Route Refresh Capability for BGP-4", Request for Comments, 2918, Networking Working Group, Sep. 2000, 4 pages.

* cited by examiner

*Primary Examiner* — Marsha D Banks Harold
*Assistant Examiner* — Christopher Wyllie
(74) *Attorney, Agent, or Firm* — Hickman Palermo Truong Becker Bingham Wong LLP

(57) ABSTRACT

In an embodiment, a method comprises: determining that a session restart on a restarting node has been initiated; in response to determining that the restarting node has preserved a last acknowledged version of routing information received from a peer node, and determining that the restarting node has preserved a routing state corresponding to the last acknowledged version of routing information, transmitting to the peer node a message indicating that the last acknowledged version of routing information and the routing state have been preserved at the restarting node; wherein the method is performed by one or more computing devices.

18 Claims, 8 Drawing Sheets

ACCELERATED ROUTING CONVERGENCE

PRIORITY CLAIM

This application claims the benefit under 35 U.S.C. 119(e) of provisional application No. 61/478,758, filed on Apr. 25, 2011, the entire contents of which are incorporated by this reference for all purposes as if fully set forth herein.

FIELD OF THE DISCLOSURE

The present disclosure relates to internetworking, particularly techniques for achieving convergence of routing information in inter-domain internetworking between autonomous systems using, for example, the Border Gateway Protocol (BGP).

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BGP graceful restart, specified for example in "Graceful Restart Mechanism for BGP," by Sangli, S., E. Chen, R. Fernando, J. Scudder, and Y. Rekhter, January 2007, RFC 4724 of the Internet Engineering Task Force (IETF), requires a complete re-advertisement of routing information across a session restart, even though partial or even complete routing information may have been preserved. For example, even if a communication session with a receiving speaker is restarted, the receiving speaker can still temporarily maintain previously received routes, and thus re-advertising of the same routing information to the receiving speaker may be unnecessary.

Unnecessary re-advertising of the routing information after a session restart can delay routing re-convergence because re-advertising can be time consuming.

This disclosure assumes a technical understanding of at least the following, as well as all foundation technologies that are referenced in: [RFC2918] Chen, E., "Route Refresh Capability for BGP-4," RFC 2918, September 2000; [RFC4271] Rekhter, Y., Ed., Li, T., Ed., and S. Hares, Ed., "A Border Gateway Protocol 4 (BGP-4)," RFC 4271, January 2006; [RFC4724] Sangli, S., E. Chen, R. Fernando, J. Scudder, and Y. Rekhter, "Graceful Restart Mechanism for BGP," January 2007; [RFC4760] Bates, T., Chandra, R., Katz, D., and Y. Rekhter, "Multiprotocol Extensions for BGP-4," RFC 4760, January 2007; [RFC5492] Scudder, J. and R. Chandra, "Capabilities Advertisement with BGP-4," RFC 5492, February 2009; US Patent Publication No. 2006/0171404; US Patent Publication No. 2008/0089231; US Patent Publication No. 2008/0089348.

DETAILED DESCRIPTION

Figure 1:
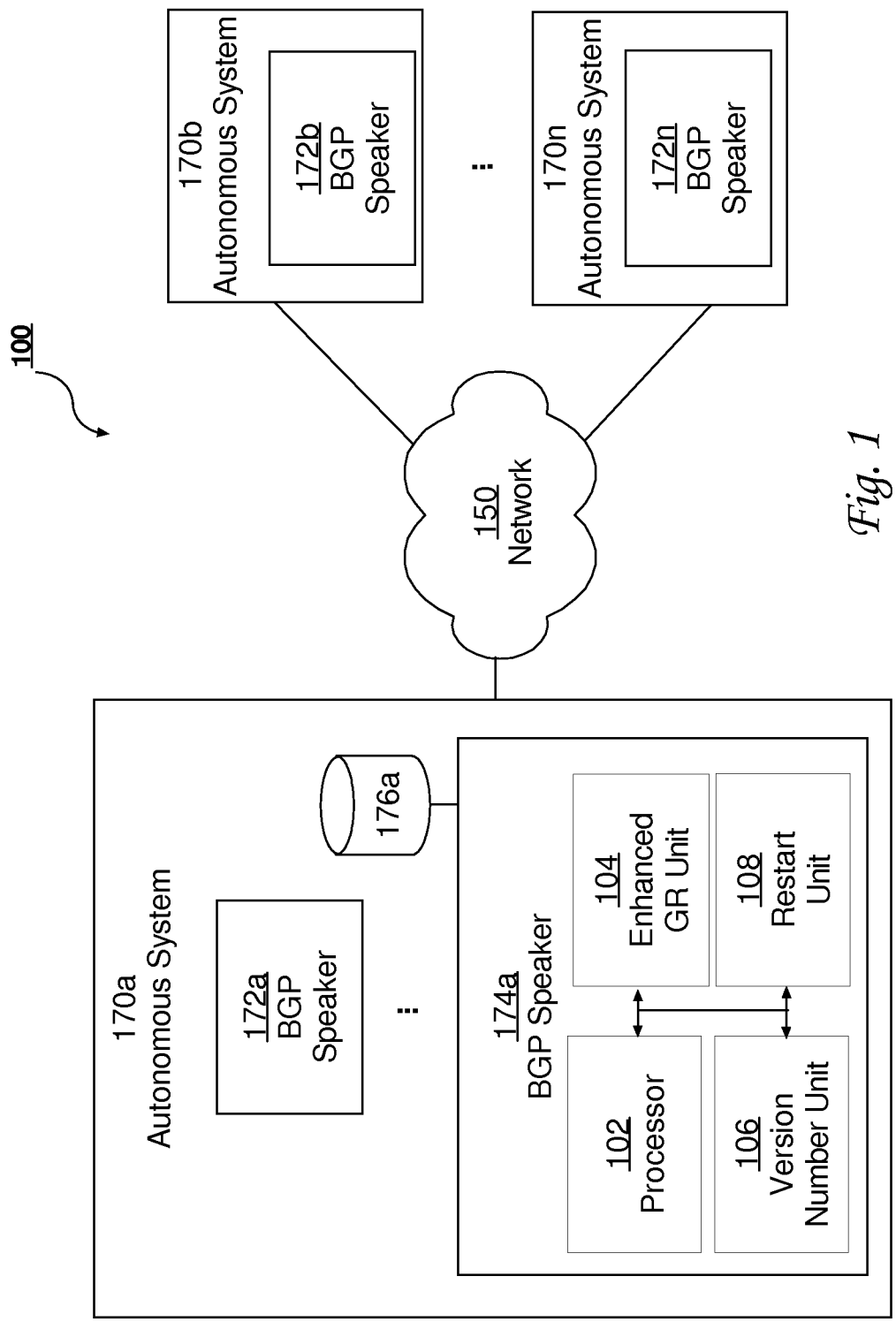
FIG. 1 illustrates an embodiment of a network of autonomous systems.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Extensions to Border Gateway Protocol (BGP) graceful restart are provided in order to avoid unnecessary transmission of the routing information preserved across a session restart, thus accelerating the process of routing convergence.

Embodiments are described herein according to the following outline:

1.0 General Overview
2.0 Structural and Functional Overview
3.0 Version Numbers for Routing Entities
4.0 Update-Version Message
5.0 Enhanced Graceful Restart Capability
6.0 Enhanced Graceful Restart Example
7.0 Error Handling
8.0 Implementation Mechanisms—Hardware Overview
9.0 Extensions and Alternatives
1.0 General Overview In an embodiment, a method presented herein comprises determining that a session restart on a restarting node has been initiated. The method further comprises transmitting, to a peer node, a message indicating that a last acknowledged version of routing information and a routing state have been preserved at the restarting node if indeed the restarting node has preserved the last acknowledged version of routing information received from a peer node and the routing state for the routing information.

In an embodiment, the method is performed by one or more computing devices.

In an embodiment, determining that the restarting node has preserved a last acknowledged version of routing information further comprises determining that a last acknowledged version of routing information indicator and an acknowledged version number indicator are the same.

In an embodiment, the method further comprises, in response to determining that the restarting node has not preserved a last acknowledged version of routing information, transmitting to the peer node an update-requesting message indicating a particular version of routing information requested by the restarting node from the peer node.

In an embodiment, the method further comprises, in response to receiving an updated version of routing information from the peer node, updating a version number associated with the update version of routing information.

In an embodiment, the method further comprises using an update version Border Gateway Protocol (BGP) message for checkpointing the updated version of routing information received from the peer node and maintained by the restarting node.

In an embodiment, the method further comprises, in response to determining that the peer node has not preserved a particular version of routing information, setting a timer, and testing whether a confirmation of receiving the particular version of routing information by the peer node is received before expiration of the timer.

In an embodiment, the restarting node and the peer node are internetworking devices that host Border Gateway Protocol (BGP).

In an embodiment, a non-transitory computer-readable storage medium stores one or more sequences of instructions which, when executed by one or more processors, cause the one or more processors to perform the processes described herein.

2.0 Structural and Functional Overview

FIG. 1 illustrates an embodiment of a network 100 of autonomous systems. In FIG. 1, network 100 comprises autonomous systems 170a, 170b, 170n. However, practical embodiments may comprise any number of autonomous systems 170.

In an embodiment, autonomous systems 170a, 170b, 170n communicate with each other directly or indirectly via a network 150. Network 150 may be used to maintain various communications sessions and may implement one or more communications protocols. For example, network 150 may implement a Border Gateway Protocol (BGP) and allow speakers connected to network 150 to exchange routing information.

The Border Gateway Protocol (BGP) is used to exchange routing information among network elements (usually routers) in autonomous systems and networks of autonomous systems. A network element that executes a BGP process is typically referred to as a BGP host, a BGP speaker or a BGP peer.

In an embodiment, each of the autonomous systems 170a, 170b, 170n, comprises one or more BGP speakers.

For purposes of illustrating clear examples, in an embodiment, FIG. 1 depicts that autonomous system 170a comprises one or more BGP speakers 172a to 174a, autonomous system 170b comprises one or more BGP speakers 172b, and autonomous system 170n comprises one or more BGP speakers 172n. However, in practical embodiments, each of the autonomous systems 170a, 170b, 170n may comprise any number of BGP speakers.

In an embodiment, BGP speakers exchange initial messages to establish a transport protocol connection with one another and open a BGP session, and then exchange routing information. During the initial connection setup, the speakers exchange all the routing information that each one maintains, possibly limited according to policy filters.

The routing information sent from a BGP speaker includes the complete routing information to each network destination reachable from the BGP speaker. Typically, the routing information includes an address prefix of the destination location (also referred to as a "prefix") and attributes that describe the path to the destination location.

At a host, routing information can be stored in a Routing Information Base (RIB). In an embodiment, a BGP RIB is implemented as a single physical routing table.

In an embodiment, a speaker 174a is a restarting router implementing accelerated network convergence techniques as described herein. Restarting router 174a receives, maintains and forwards network routing information to other speakers 172a in autonomous system 170a, and speakers in autonomous system 170b, 170n.

As depicted in FIG. 1, each of the speakers in autonomous systems 170b, 170n may be communicatively coupled to restarting speaker 174a directly or indirectly through any of one or more links, networks, internetworks, or other routers.

In an embodiment, speakers 172a, 174a, 172b to 172n host an executable module that implements BGP. In the same or other embodiments, the speakers are configured to implement Graceful Restart (GR) capability and/or enhanced graceful restart (EGR) capability. Alternatively, different protocols and capabilities may be used. Further, the capabilities described herein may be labeled or referenced using terms other than GR or EGR, which are provided as examples; functionally equivalent capabilities are within the scope of this disclosure regardless of the label or reference that is used to identify them. Executable modules may comprise programmed chips, special-purpose computing logic, or one or more computer programs carried on data storage media or hosted on one or more processors.

In an embodiment, speaker 174a comprises a processor 102, an enhanced graceful restart (EGR) unit 104, a version number unit 106 and a restart unit 108.

For purposes of illustrating clear examples, FIG. 1 shows that speaker 174a comprises one processor 102, one EGR unit 104, one version number unit 106 and one restart unit 108. However, in practical embodiments, each of speakers 172a, 174a, 172b, 172n may comprise one or more processors 102, one or more EGR units 104, one or more version number units 106 and one or more restart units 108.

In an embodiment, a processor 102 facilitates communications to and from speaker 174a, processes commands received by and executed by speaker 174a, processes responses received by speaker 174a, and facilitates various types of operations executed by speaker 174a. Processor 102 comprises hardware and software logic configured to execute various processes on BGP speaker 174a.

In an embodiment, an EGR unit 104 is configured to determine whether speaker 174a is configured to support enhanced graceful restart capabilities, and recognize and process enhanced graceful restart messages, as described below. For example, EGR unit 104 may be configured to recognize whether speaker 174a is configured to generate and send an UPDATE-VERSION message, as described below.

In an embodiment, a version number unit 106 is configured to determine, maintain and update version numbers for routing information that BGP speaker 174a communicates to its peers. For example, version number unit 106 may be configured to implement extensions to the BGP graceful restart mechanism. The extensions utilize an indicator of routing information version that a router received from a peer or sent to a peer during a communications session. The indicator may be also referred to as a version number determined based on a sequence number of the updates exchanged between the peers. Version numbers need not be strictly numeric values and may comprise any character sequence that a computer can process.

For example, version number unit 106 may associate a version number and keep track of the version number associated to the routing information maintained by BGP peers and exchanged by the peers when new updates become available. In an embodiment, a version-number based mechanism is used to keep track of the routing information exchanged between BGP peers and across a session restart established when one of the BGP peers is restarted.

In an embodiment, a restart unit 108 is configured to execute a graceful restart of speaker 174a. If speaker 174a is equipped with enhanced graceful restart capability, then restart unit 108 can also execute the functionalities of the enhanced graceful restart.

EGR is designed to reduce the duration and effect of outages associated with a failed BGP process. To reduce the effect of outages associated with the failed BGP process, EGR may be incorporated into functionalities of a BGP host and its peers.

In an embodiment, when an initial BGP connection between a host and a peer is established, if both a host and its peers support EGR capability, then the host and peers exchange messages indicating that each of them supports EGR capability. For example, a host can send a BGP OPEN message to its peer to indicate that the host supports the enhanced graceful restart capability.

EGR may present BGP speakers from immediately purging routing information from their tables when a communications session between BGP peers fails and a peer becomes unavailable. According to one approach, in response to determining that one of the BGP speakers failed, BGP peers preserve routing information associated with the failed BGP speaker in a stale state for a predefined time period, hoping that by the time the predefined time period expires, the failed BGP speaker will successfully restart communications with the peers. Once the failed BGP speaker restarts, the restarting BGP speaker communicates to its peers that the restarting speaker is still in a forwarding state and, hence, the restarting speaker can continue to receive and forward packets.

When restarting speaker 174a restarts and opens a new BGP communications session with a peer 172a, restarting speaker 174a sends messages having certain flags set to notify peer 172a that speaker 174a has restarted and that speaker 174a supports the EGR capability. Upon receiving an EGR capability message from restarting speaker 174a, if peer 172a also recognizes the EGR capabilities, then peer 172a does not send all their routing information to restarting speaker 174a, as it would be the case in a graceful restart approach. Instead, peer 172a sends only those updates to restarting speaker 174a that are requested by restarting speaker 174a, or that are generated after the last routing information update was acknowledged by restarting speaker 174a.

The EGR approach herein provides a mechanism to avoid unnecessary transmissions of the routing information that has been preserved across a session restart. Therefore, the EGR capability allows accelerating network convergence after a session restart. For example, while under graceful restart without EGR as specified herein, a restarting speaker is still flooded by routing update messages once the restarting speaker comes online. With EGR as disclosed herein, the restarting speaker may receive only those routing information updates that were generated after a last routing information update was acknowledged. While under a graceful restart without EGR, a restarting speaker is redundantly flooded by routing update messages from its peers. With EGR as disclosed herein, the peers do not transmit the non-essential and redundant information to the restarting speaker 174a.

Restarting speaker 174a also may comprise a repository 176a that maintains version numbers for each route available from restarting speaker 174a and version numbers for routing information transmitted from speaker 174a to each peers 172a, 172b, 172n. Repository 176a may be a table, database, or other structure or storage device capable of maintaining state information about peers of restarting speaker 174a. Although not depicted in FIG. 1, peers 172a, 172b, 172n may also maintain repositories for version numbers.

The structure and content of the version numbers maintained by each of the peers 172a, 172b, 172n, 174a may vary. For example, a version number may include sequencing information, as described below, which may be used to identify the latest version of routing information for a particular route sent to a particular peer.

In an embodiment, a version number may be imbedded in a routing information update message. Upon receiving a routing information update message, a receiving BGP speaker can acknowledge a receipt of the routing information update message to a sender, extract the version number from the update message and store the version number in a repository associated with the receiving BGP speaker.

A version number associated with a particular route may be received in a conventional BGP UPDATE message and stored in a repository so that the particular route can be quickly retrieved after a restart once the version number is retrieved from the repository.

3.0 Version Numbers for Routing Entities

In an embodiment, improvements to BGP graceful restart are described. In an embodiment, an EGR process allows avoiding unnecessary transmission of the routing information preserved across a session restart. In an embodiment, BGP graceful restart allows accelerating re-convergence of the routing information stored in routing tables maintained by BGP speakers in autonomous systems.

In an embodiment, an indicator is provided for a routing information version that a router received from a peer or sent to a peer during a communications session. The indicator may comprise a version number, and may be determined based on the sequence number of the updates transmitted to a peer.

In an embodiment, a version-number based mechanism is used to keep track of the routing information maintained by BGP peers and exchanged by the BGP peers when new updates become available.

In an embodiment, a version-number based mechanism is used to keep track of the routing information to be exchanged across a session restart taking place when one of the BGP peers is restarted.

In an embodiment, a version-number based mechanism utilizes an update-version BGP message type, which may be used for checkpointing an update version of routing information maintained for a peer BGP router. The new BGP update-version message enhances graceful restart capabilities by facilitating enhanced procedures for handling routing information updates across a session restart between BGP peers.

In an embodiment, to avoid unnecessary transmission of the routing information that might have been preserved across a session restart, one BGP speaker identifies a version of the routing information that has been sent to, acknowledged and preserved by another BGP speaker despite the restart.

In an embodiment, a restarting BGP speaker identifies a version of the routing information that has been preserved by a remote BGP speaker by utilizing a version number, which the restarting BGP speaker associates with and maintains for the remote BGP speaker.

In an embodiment, a restarting BGP speaker identifies for each of its peers (remote BGP speakers) a version of the routing information that has been preserved by a respective remote BGP speaker. For each of the peers, the restarting BGP speaker maintains an associated routing information version number.

In an embodiment, for a given remote BGP peer, a restarting BGP speaker maintains a version number that indicates the highest version of the routing information that the restarting BGP speaker sent to the remote BGP peer. For example, if a restarting speaker sent to a remote peer two updates of the routing information and receipts of the two respective updates were successfully acknowledged, then the version number maintained by the restarting speaker for the remote peer may indicate the second (the highest) update of the routing information. In this example, the version number maintained by the restarting speaker and associated with the remote peer can indicate that the second update of the routing information that has been preserved by the remote speaker across the restart session.

Similarly, a remote BGP peer may maintain a version number for a restarting BGP speaker. For example, if prior to a restart, the remote speaker sent to a peer two updates of the routing information and receipts of the two respective updates were successfully acknowledged, then the version number maintained by the remote peer for the restarting speaker may indicate the second (the highest) update of the routing information, which should have been preserved by the restarting speaker across a restart session.

In an embodiment, a version number is stored as an integer or floating point number that unambiguously indicates a particular version of the routing information. For example, a version number may be defined as an unsigned, 8-octet-long integer. In this example, value 0 may be used to indicate the beginning (an epoch) of the update generation, also referred to as a sequence of routing information related to the same route or the same node.

In an embodiment, for a route to a particular peer, a BGP speaker calculates a version number as the maximum of the version numbers of all the routes and messages that contained information of the routes and that have been sent to the particular peer.

In an embodiment, a version number is created when a route or a message is sent to a particular peer, or when a route or a message is modified and sent to the particular peer.

In an embodiment, a version number for a particular route or message is maintained by a BGP speaker for each peer of the BGP speaker.

In an embodiment, the number space for the version numbers is specific to family identifiers, such as an Address Family Identifier and a Subsequent Address Family identifier (AFI/SAFI). AFI/SAFI can be included in, for example, a BGP OPEN message, as described below.

In an embodiment, a mapping is stored to correlate the version numbers used to indicate versions of routing information pertaining to a particular route or node and AFI/SAFI identifiers used to identify a network layer protocol for the particular route.

As described for example in RFC 4760, according to BGP, an Address Family Identifier (AFI) and an Subsequent Address Family Identifier (SAFI) specify a set of network-layer protocols to which the address carried in a Next Hop field of an BGP UPDATE message belongs.

Many of the existing AFI/SAFIs allow a Next Hop to belong to either the IPv4 Network Layer Protocol or the IPv6 Network Layer Protocol, and specify the encoding of the Next Hop information in order to determine the protocols to which a particular address actually belongs. For example, as described in RFC 4684, the Next Hop address may be either IPv4 or IPv6, and the Next Hop field address may be interpreted as an IPv4 address when the length of Next Hop address is four octets, or as an IPv6 address when the length of the Next Hop address is 86 octets.

In an embodiment, version numbers may also be assigned using a number space that is not AFI/SAFI specific. For example, the number space for the version numbers may be specific to non-update information, such as ROUTE-REFRESH information, which can be included in calculations of the update version for a peer.

In an embodiment, the latest version of a particular route advertised by the speakers is indicated by a version number associated with the route. For example, upon sending the latest version of a particular route to a peer, the speaker may associate an indicator of the latest version of the particular route sent to the BGP peer as a checkpoint, and the peer can use the indicator of the latest version of the particular route received from the speaker to checkpoint the routes.

In an embodiment, the term checkpointing refers to determining the latest version of routing information pertaining to a particular route and/or sent to a particular peer and confirmed by the particular peer. The term checkpointing also refers to comparing the checkpointed version of the routing information with another version of routing information pertaining to the same route or the same peer.

In an embodiment, a speaker can determine whether a given version of routing information has been already sent to a particular peer by comparing a version of the given routing information with the version number that the speaker created and stored for the particular peer and that is associated with the same routing information epoch.

In an embodiment, by checkpointing the update version for a peer across a session restart, a speaker can determine what has been preserved by a remote speaker, and also what remains to be sent. For example, after a restart of one of the speakers in a speaker-pair, the speaker can checkpoint the update version for another speaker from the pair and determine whether the latest versions of the routes, previously advertised to the another speaker, survived the restart. If the latest versions of the routes have not survived the restart, then the required routes updates may be transmitted to the speaker.

4.0 Update-Version Message

In an embodiment, an UPDATE-VERSION message can be used by a speaker to carry an update version of routing information, acknowledge a receipt of an update version, or request updates for the last update version that has been acknowledged by the speaker. Alternative embodiments may use messages having other names or labels that are integrated into functionally similar or identical processes. Thus, the label "UPDATE-VERSION" is provided merely as one example and is not the exclusive label that could be used for a functionally similar message.

In an embodiment, an UPDATE-VERSION message supports for the version number approach described above.

Figure 5:
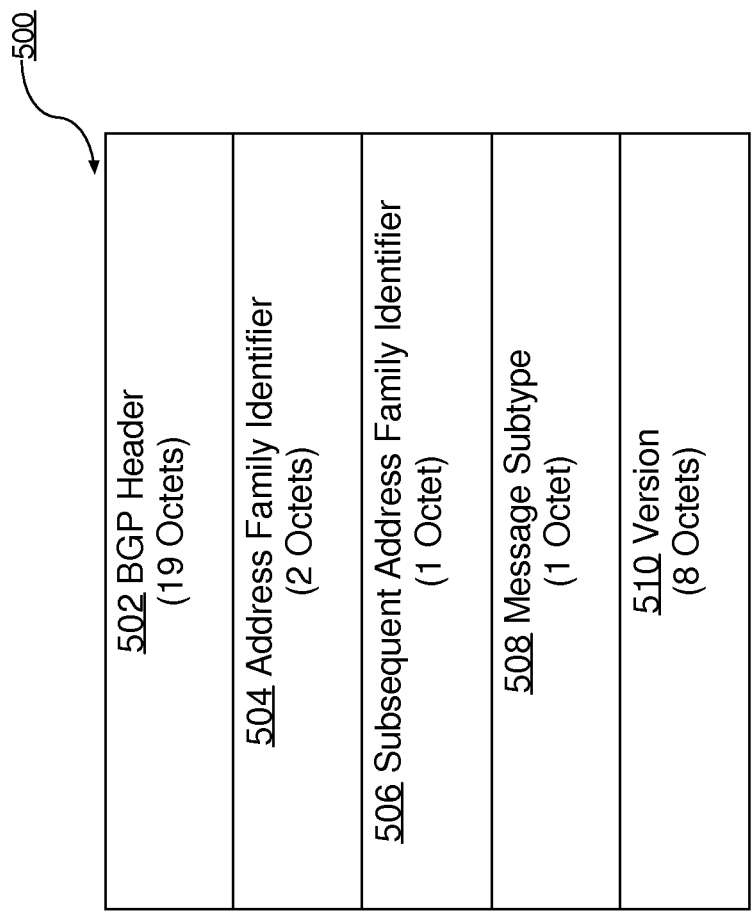
FIG. 5 illustrates an embodiment of an update version message.

FIG. 5 illustrates an embodiment of an example UPDATE-VERSION message 500. In an embodiment, UPDATE-VERSION message 500 carries information about a version number used to determine the routing information version that a BGP speaker received or expected to receive.

In an embodiment, UPDATE-VERSION message 500 comprises a BGP header 502, as described in for example RFC 4271. A BGP header usually comprises 19 octets consisting of a 16-octet-long marker field that is set to all ones, a two-octet-long length field that indicates the total length of the message, and a one-octet-long type code field that indicates the type of the message. In an embodiment, the type code field carries a value identifying the UPDATE-VERSION type of message. The specific value is immaterial provided that the UPDATE-VERSION type of message is identified.

In an embodiment, as depicted in FIG. 5, in addition to a header, UPDATE-VERSION message 500 also comprises an address family identifier (AFI) 504, a subsequent address family identifier (SAFI) 506, a message subtype 508 and a version number 510.

In an embodiment, an address family identifier (AFI) 504 is a two-octet-long field that stores an address family identifier specifying the encoding of a Next Hop information for a particular route. The AFI is used to determine the protocols to which a particular address belongs.

In an embodiment, an address family identifier 504 carries a value indicating an identity of the network layer protocol associated with the Network Layer Reachability Information (NLRI) carried in a version number 510 field.

In an embodiment, a subsequent address family identifier (SAFI) 506 is a one-octet-long field that stores additional information about the type of the NLRI carried in a version number 510 field. Detailed information about the AFI/SAFI fields is provided for example in RFC 4760.

In an embodiment, a message subtype 508 is an eight-octet-long field that stores information supporting the enhanced graceful restart capabilities. In particular, the message subtype 508 field may comprise information that indicates one of a plurality subtypes of the UPDATE-VERSION message. In an embodiment, three subtypes are provided. The first subtype encoded in the message subtype field 508 indicates whether a BGP speaker that sends the UPDATE-VERSION message is sending an update version of routing information to a BGP peer. The second subtype indicates that a BGP speaker acknowledges a receipt of an update version received by a BGP peer. The third subtype indicates that a BGP speaker requests updates from a BGP peer for the very last update version the BGP speaker has already acknowledged, but which for some reason was not preserved after a session restart.

In an embodiment, the specific subtype of the UPDATE-VERSION message is encoded using unique numbers. In one implementation, the code for sending an update version of routing information is 1, the code for acknowledging a receipt of an update version is 2, and the code for requesting updates for the very last update version that a BGP speaker has already acknowledged is 3. In other embodiments, other values may be used.

In an embodiment, a version field 510 stores an update version associated with the message subtypes having codes 1 or 2. For example, if the UPDATE-VERSION message is used to send update version of routing information to a BGP peer (code 1), then version field 510 can include the version number of the routing information update. According to another example, if the UPDATE-VERSION message is used to acknowledge a receipt of an update version (code 2), then version field 510 can include information indicating the version number of the routing information update that is being acknowledged.

In an embodiment, the value stored in version field 510 of an UPDATE-VERSION message is irrelevant when the message subtype 508 stores code 3, which indicates that the UPDATE-VERSION message is used to request updates for the very last update version that a BGP speaker has already acknowledged. For example, if a BGP speaker has already acknowledged receipt of the third version of routing information for a particular route, then the BGP speaker can send an UPDATE-VERSION message to a BGP peer requesting any updates for the third version of the routing information for the particular route. In such a case, the BGP speaker may not know how many versions of updates are available, and thus the BGP speaker may not be able to specify the version of the requested updates.

5.0 Enhanced Graceful Restart Capabilities

BGP graceful restart requires a complete re-advertisement of the routing information if one of BGP speakers is restarted, even though partial or even complete routing information is usually preserved despite a session restart.

In an embodiment, the EGR approach herein avoids unnecessary transmissions of the routing information that is preserved on a restarting BGP router and its peers.

According to the EGR approach herein, in an embodiment, upon a session restart, a restarting BGP speaker can advertise to its peer the EGR capability, and if a peer recognizes the EGR capability, then the restarting speaker can determine whether the routing information has been preserved after the restart, and if not, can request the routing information that is necessary.

For example, after advertising the EGR capability, a restarting BGP speaker can evaluate its stored routes and checkpoint them against version numbers associated with the respective routes. The restarting speaker can revise a list of all the routes received in the most recent set of updates against the information about the routes that have been preserved after the restart, and cross-reference the revised list with the stored version number values. Furthermore, the restarting speaker can compare the list of the routes and the respective version number values and determine if any route information has been lost due to the restart. If no route information has been lost due to the restart, then re-advertising of the routing information is unnecessary. However, if some route information has been lost due to the restart, then the restarting speaker can request the missing information.

Advertising EGR capability may be accomplished in a variety of ways. In an embodiment, a BGP speaker that supports capability advertisement can send a BGP OPEN message to its BGP peers. The BGP can include an optional parameter, called Capabilities, in the BGP OPEN message to indicate the EGR capability.

In an embodiment, both peers need to advertise the EGR capability before the peers can utilize the EGR capability. If either peer of a peer-pair has not advertised the EGR capability, then neither peer of the peer-pair can utilize the EGR capability.

In an embodiment, a speaker determines that its peer does not support an EGR capability if, in response to an OPEN message that carries the EGR parameter, the speaker receives a NOTIFICATION message with an error sub code indicating that the EGR parameter is an unsupported optional parameter. In such a case, the speaker can attempt to re-establish a BGP connection with the peer by sending an OPEN message which does not include the EGR parameter.

In an embodiment, an EGR parameter comprises information about the capability code, capability length and capability value. The capability code complies with an international standard and can be assigned by the Internet Assigned Numbers Authority (LANA) according to IANA's policies and procedures. The code for the EGR parameter is to be determined by IANA. The capability length filed for the EGR parameter is determined to be 0.

In an embodiment, by advertising an enhanced graceful restart capability to a peer, a BGP speaker conveys to the peer that the speaker is capable of receiving and properly handling a BGP OPEN message with an EGR parameter and is capable of receiving and properly handling an UPDATE-VERSION message.

In an embodiment, the enhanced graceful restart capability may be advertised in a BGP OPEN message as part of the optional capabilities parameter.

Figure 6:
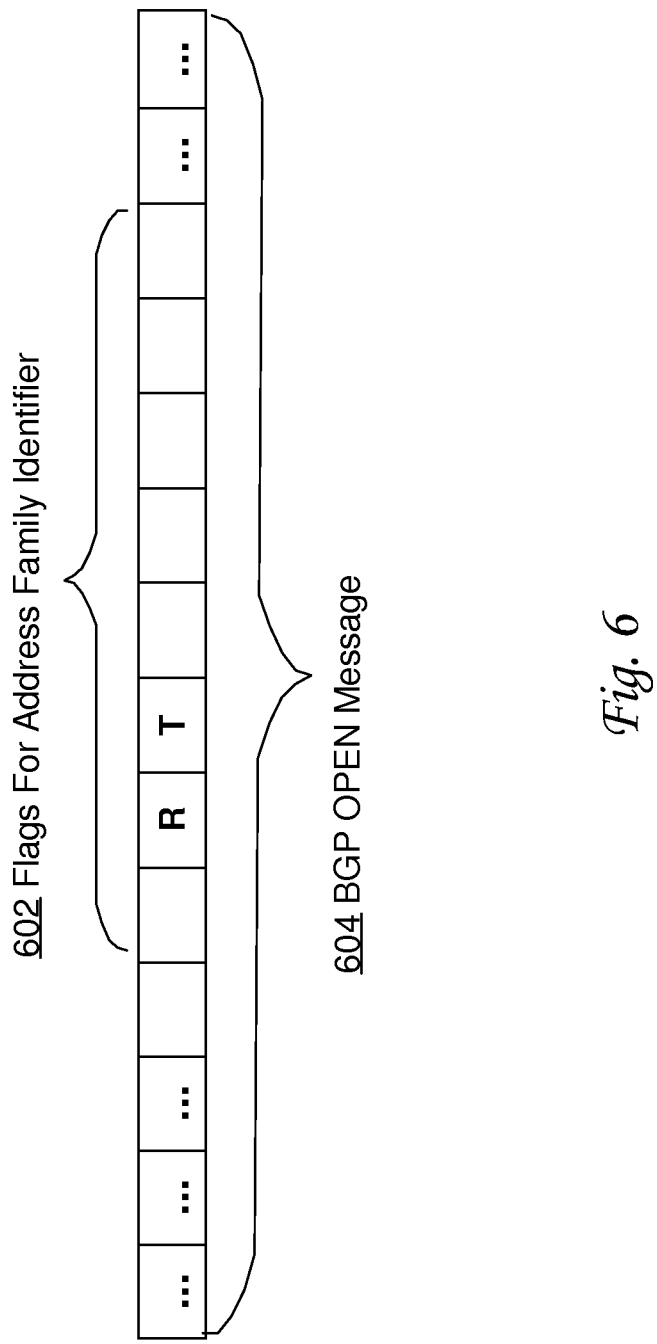
FIG. 6 illustrates an embodiment of enhanced graceful restart capability flags.

FIG. 6 illustrates an embodiment of EGR capability flags included in a BGP OPEN message. In an embodiment, a BGP OPEN message 604 comprises an optional capability parameter set to the EGR parameter value. The BGP OPEN message 604 also comprises flags for address family identifier field 602. The field 602 comprises two new bit flags R and T. In an embodiment, the location of flags R and T is fixed; flag R is the second most significant bit in the flag field 602, and flag T is the third significant bit, as depicted in FIG. 6.

In an embodiment, the second most significant bit in the flag field 602 corresponds to flag R, and is defined as the RX Routing State. The RX Routing State indicates whether the routes of the given AFI/SAFI received by a restarting BGP speaker have indeed been preserved up to the update version acknowledged by the BGP speaker previously. When the RX Routing State is set (value 1), the bit indicates that the routes have been preserved. However, the RX Routing State is not set in the flag field 602 if the restating BGP router determined that the routes have not been preserved.

In an embodiment, the third most significant bit in the flag field 602 corresponds to flag T, and is defined as the TX Routing State. The TX Routing State indicates whether a restarting BGP speaker has preserved enough state to resume advertising routes of the given AFI/SAFI from the update version received and acknowledged by a peer previously. When the TX Routing State is set (value 1), the bit indicates that the state has been preserved. However, the TX Routing State is not set in the flag field 602 if the restating BGP router determined that no enough state to resume advertising routes of the given AFI/SAFI has been preserved.

6.0 Enhanced Graceful Restart Example

In an embodiment, routing information includes reachable and unreachable information as well as other AFI/SAFI specific, non-update information. While advertising routing information to other peers, a BGP speaker maintains state information associated with the routing information.

To resume sending routing information for an AFI/SAFI after a session restart, a speaker needs to maintain all the routing information that has been already sent to a peer but not acknowledged by the peer is received by the speaker. Furthermore, the speaker needs to maintain enough state information associated with the routing information.

A route acknowledgment mechanism can vary and depend on the approach for determining a time duration during which a BGP speaker expects to receive an acknowledgment from a peer. In an embodiment, a BGP speaker can maintain a locally configurable time-period threshold specifying an upper bound for the time period during which the BGP speaker expects to receive an acknowledgment from a peer that the peer received a particular update version of the routing information.

In an embodiment, the time-period threshold can also indicate the time period during which the BGP speaker should maintain the state corresponding to the particular update version of the routing information and preserve it in the case a receiving peer is a slow peer (unable to generate an acknowledgment in a timely fashion). If the BGP speaker does not receive an acknowledgment from the peer within the specified time period, then the maintained state can be compromised. If that happens, then the BGP speaker can clear the TX Routing State flag in the enhanced graceful restart capability message, and advertise the enhanced graceful restart capability message with the TX Routing State flag unset in the next session restart. In an embodiment, the suggested time-period threshold value is 30 minutes.

Figure 2:
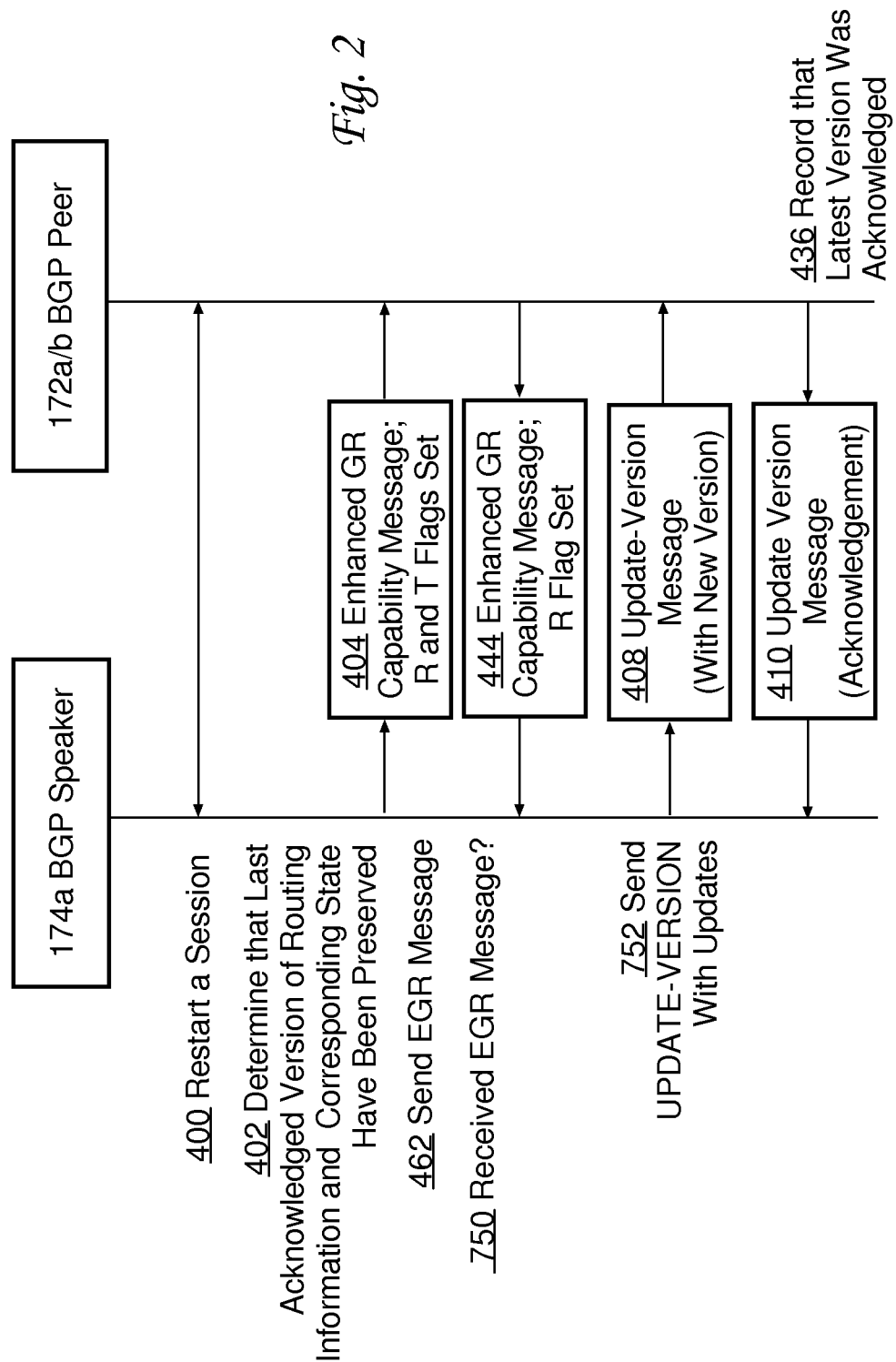
FIG. 2 illustrates an embodiment of implementing enhanced graceful restart capabilities in BGP speakers.

FIG. 2 illustrates an embodiment of implementing EGR in BGP speakers 174a, 172a/b. In FIG. 2, a BGP speaker 174a is a restarting speaker. Speaker 174a communicates with a BGP peer 172a and/or a BGP peer 172b. In the description below, references are made to peer 172a only; however, it should be understood that the references are meant to be to any of the peers 172a, 172b, 172n.

Speaker 174a can advertise EGR capability to its peer 172a if the speaker 174a is capable of receiving and properly handling the UPDATE-VERSION message. Speaker 174a should be able to recognize the UPDATE-VERSION message and recognize an RX Routing State flag for an AFI/SAFI and a TX Routing State flag for an AFI/SAFI. Furthermore, speaker 174a should be able to recognize the UPDATE-VERSION request for updates from the very last update version that has acknowledged.

Similarly, peer 172a can advertise an EGR capability to speaker 174a if peer 172a is capable of receiving and properly handling the UPDATE-VERSION message, and recognize the EGR-specific flags in the UPDATE-VERSION message.

Figure 7:
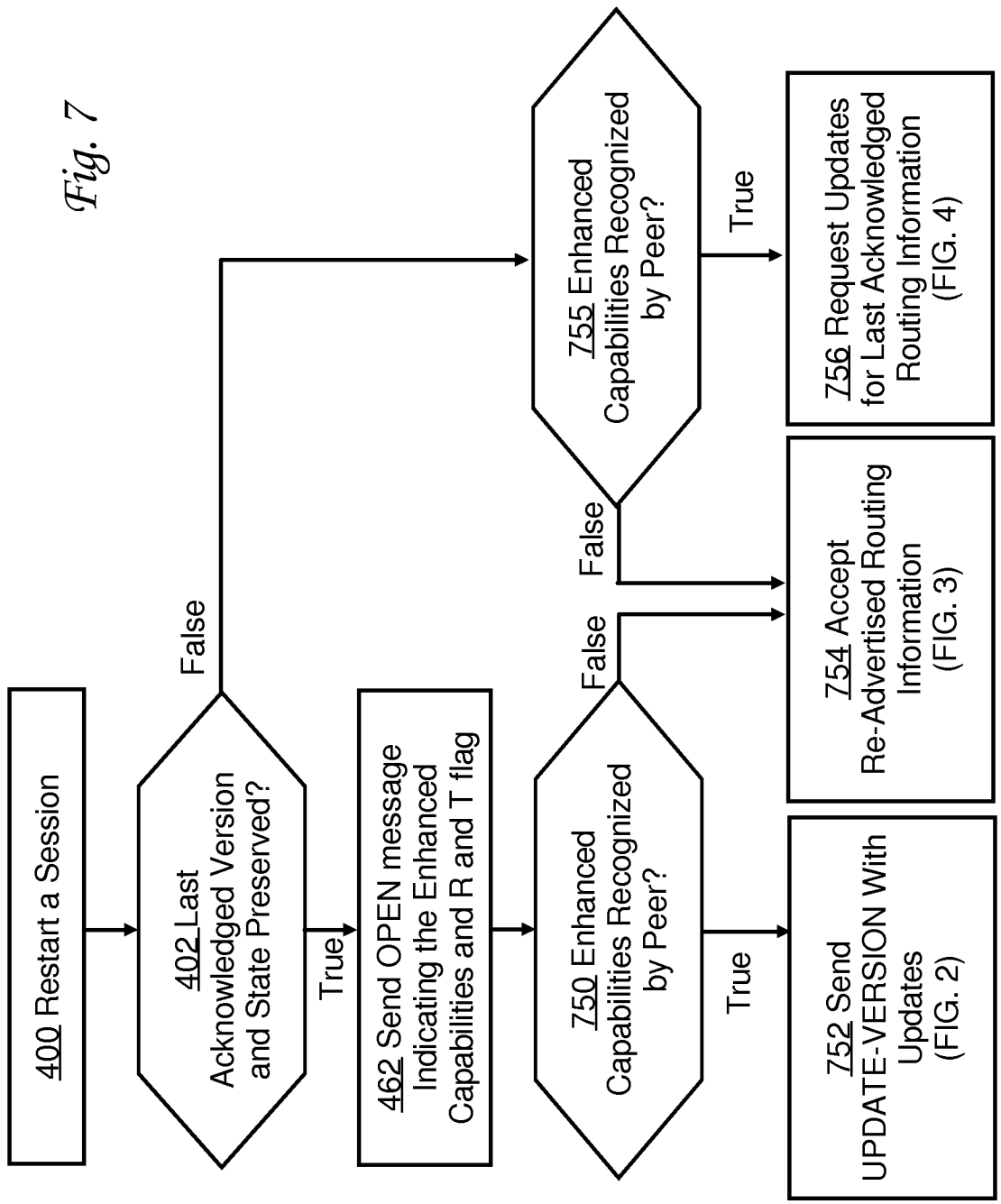
FIG. 7 illustrates an embodiment of a flow chart for implementing enhanced graceful restart capabilities in a BGP speaker.

Steps 400, 462, 750 and 752 depicted in FIG. 2, are also depicted in FIG. 7; hence the description of steps 400, 462, 750 and 752 refers to both FIGS. 2 and 7.

FIG. 7 illustrates an embodiment of a flow chart for implementing enhanced graceful restart capabilities in a speaker 174a.

In step 400 (FIGS. 2 and 7), a speaker 174a restarts a communication session with a peer 172a. It is assumed that speaker 174a supports the EGR capability.

In step 402 (FIGS. 2 and 7), speaker 174a determines whether a last acknowledged version of routing information corresponding to a particular AFI/SAFI has been preserved and whether enough state for the routing information that has been already sent to a peer but not acknowledged by the peers has been preserved.

If the determination is positive, then, speaker 174a proceeds to executing step 462. Otherwise, speaker 174a proceeds to executing step 755, in which speaker 174a determines whether peer 172a supports the EGR capabilities, and if so, proceeds to executing step 756; otherwise, proceeds to executing step 754.

In step 462 (FIGS. 2 and 7), speaker 174a generates and transmits a BGP OPEN message 404, indicating that speaker 174a recognizes EGR capabilities and that the last acknowledged version of routing information and routing state have been preserved.

If peer 172a is configured to support the EGR capability, then peer 172a can send a BGP OPEN message to speaker 174a, indicating the EGR capability.

In an embodiment, if peer 172a is configured to support both the EGR and GR capabilities, then peer 172a can send a BGP OPEN message with parameters indicating both the EGR and GR capabilities. However, when both the GR capability and the EGR capability are included in the OPEN message, it is recommended (though not required) that the EGR capability be placed in the OPEN message ahead of the GR Capability.

When speaker 174a receives indications of both the GR capability and the EGR capability from its peer 172a, and the received EGR capability has the RX Routing State flag set for an AFI/SAFI, then speaker 174a may act as if the End-of-Rib (EOR) marker for the AFI/SAFI, indicating the end of the update routing information, were received from peer 174a. In this situation, the RX Routing State flag indicates that during the session restart, the routes of the given AFI/SAFI that were received have been indeed preserved up to the update version acknowledged by speaker 174a.

If peer 172a does not support the EGR capability, but supports the GR capabilities, then peer 172a can send a BGP OPEN message with parameters indicating that GR capability is supported by peer 172a. In such a case, in processing the GR capability in an OPEN message received from peer 172a, speaker 174a should not examine the two new bit flags defined for EGR unless the OPEN message also includes an indication of the EGR parameter and the EGR capability code are also present in the OPEN message.

In an embodiment, only if an indication that peer 172a supports the EGR capability, speaker 174a can send an UPDATE-VERSION message to peer 172a. For example, after receiving an OPEN message 444, indicating the EGR capability of peer 172a, speaker 174a can send an UPDATE-VERSION message 408 to peer 172a.

In step 750 (FIGS. 2 and 7), speaker 174a determines whether a message confirming that peer 172a also supports the EGR capability and routing information and state was received. If such a message was received, speaker proceeds to step 752. Otherwise, speaker 174a proceeds to step 754.

In step 752 (FIGS. 2 and 7), speaker 174a determines whether any update version of the routing information for an AFI/SAFI is available, and if so, transmits that version to peer 172a.

In an embodiment, after speaker 174a received an indication that peer 172a supports the EGR capability, speaker 174a can send an UPDATE-VERSION message 408 carrying the update version and non-UPDATE messages for an AFI/SAFI. For example, speaker 174a can send an UPDATE-VERSION message 408 with routing information update and an indication of an update version of routing information for the AFI/SAFI. In an embodiment, the message subtype field of the UPDATE-VERSION message 408 is value of 1.

In response to receiving the UPDATE-VERSION message 408, peer 172a can respond with an acknowledgment of a receipt of the update version. The acknowledgement may be sent in a form of an UPDATE-VERSION message 410, comprising an indication that the update version of routing information for an AFI/SAFI was successfully received. In an embodiment, the indication may be stored in a message subtype field of the UPDATE-VERSION message 410 as value of 2.

In step 436, upon sending an acknowledgment to an UPDATE-VERSION message with updates, peer 172a can record the latest acknowledged update version for future references.

An exchange of the UPDATE-VERSION message can continue as long as update routing information needs to be exchanged between speaker 174a and peer 172a. However, because speaker 174a and peer 172a both recognize the EGR capabilities, only the update routing information is transmitted between speaker 174a and peer 172a. The exchange does not involve transmitting that routing information, a receipt of which was acknowledged prior to a restart of speaker 174a.

In an embodiment, to further reduce transmissions between speaker 174a and peer 172a and to reduce the overhead caused by an excessive number of UPDATE-VERSION messages exchanged between speaker 174a and peer 172a, the update routing information can be batched. For example, one UPDATE-VERSION message 408 may be used to transmit not just one routing update for an AFI/SAFI, but to transmit a number of the routing updates.

Although not depicted in FIG. 2, speaker 174a can also receive UPDATE-VERSION messages with update routing information for an AFI/SAFI from peer 172a. When speaker 174a receives an UPDATE-VERSION message carrying the updates, speaker 174a determines whether the AFI/SAFI identifiers carried in the message do match any AFI/SAFI identifiers that speaker 174a maintains to keep track of the routing information received from peer 172a.

If speaker 174a is not configured to receive the particular AFI/SAFI carried in the UPDATE-VERSION message, then the UPDATE-VERSION message can be ignored. Otherwise, speaker 174a may send an acknowledgement UPDATE-VERSION message to acknowledge a receipt of the update version. The UPDATE-VERSION messages carrying the acknowledgments can be sent in the same order as the received UPDATE-VERSION messages carrying the update versions.

Although not depicted in FIG. 2, speaker 174a can also received an UPDATE-VERSION message acknowledging a receipt of an update version of routing information. When speaker 174a receives an acknowledgment UPDATE-VERSION, speaker 174a can record the latest acknowledged update version for future references.

In an embodiment, when both speaker 174a and peer 172a support EGR capability, the last update version of the routing information transmitted to peer 172a is confirmed as survived a restart if the TX Routing State flag is set in the OPEN message transmitted by speaker 174a to peer 172a, and the RX Routing State flag is also set in the OPEN message transmitted by peer 172a to speaker 174a.

In an embodiment, procedures for purging stale routes may not be followed by peer 172a because speaker 174a will not re-advertise the routes to peer 172a.

Figure 3:
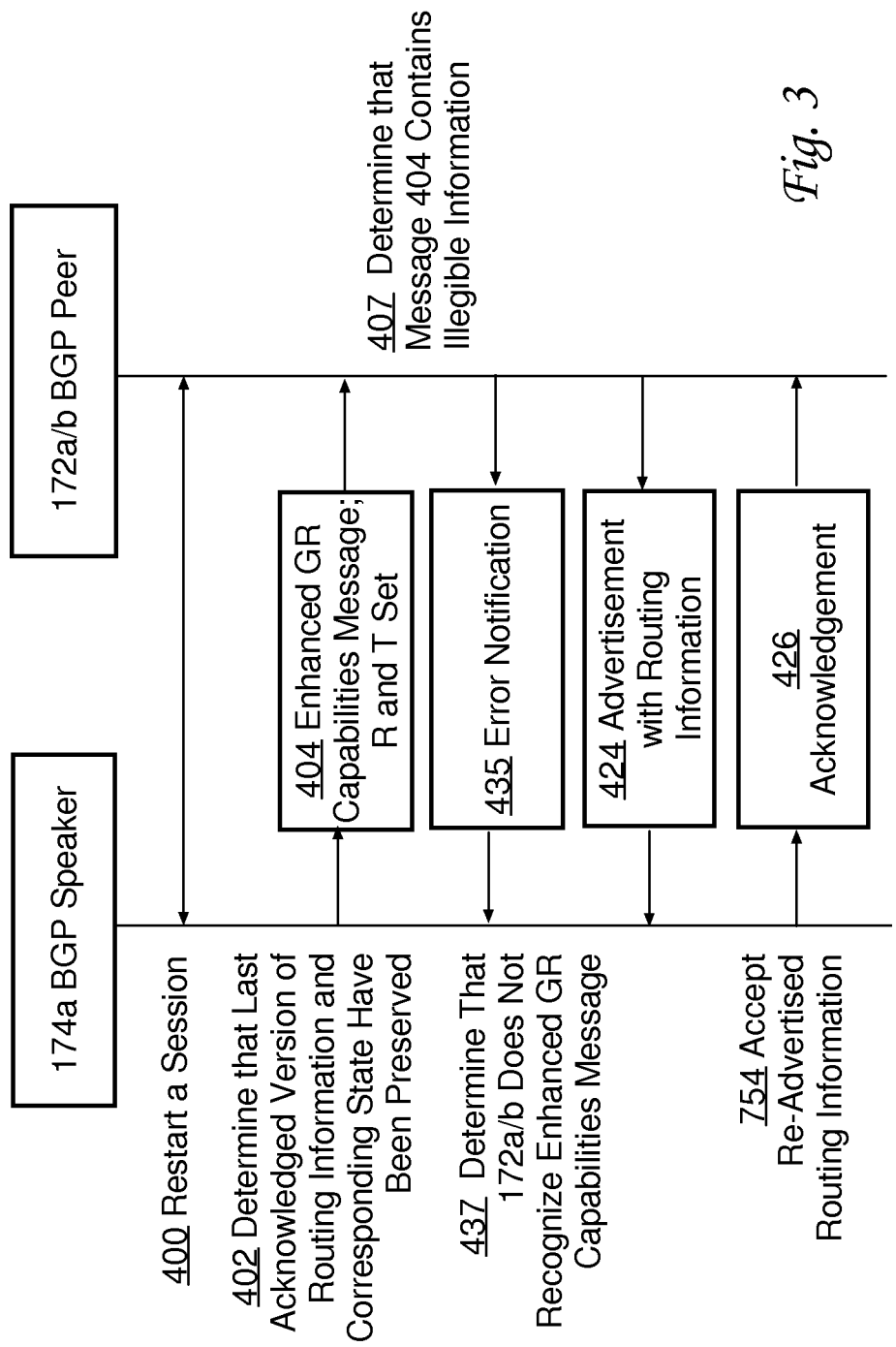
FIG. 3 illustrates an embodiment of implementing enhanced graceful restart capabilities in BGP speakers.

However, if in step 750 of FIG. 7, speaker 174a determined that peer 172a does not recognize the EGR capability or that a message confirming the EGR capabilities of peer 172a was not timely received, then speaker 174a proceeds to step 754, in which speaker 174a accepts re-advertised routing information, and which is also described in detail in FIG. 3.

Step 754 is described in both FIG. 7 and FIG. 3.

FIG. 3 illustrates an embodiment of implementing EGR capabilities in BGP speakers. In FIG. 3, steps 400 and 402, and message 404 are the same as those described in FIG. 2.

In an embodiment depicted in FIG. 3, speaker 174a is configured to support the EGR capability; however, peer 172a is not configured to support the EGR capability.

Upon receiving message 404 from speaker 174a, peer 172a analyzes the message 404 and determines that at least part of the message 404 contains information that is illegible and ineligible for peer 172a. Therefore, peer 172a generates an error message notification 435 and transmits the error message notification 435 to speaker 174a.

In step 437, upon receiving an error message notification 435, speaker 174a determines that peer 172a most likely does not recognize the EGR capability. Therefore, speaker 174a determines that speaker 174a cannot communicate with peer 172a using messages specific to the EGR. For example, speaker 174a cannot transmit a BGP OPEN message with the EGR parameter, and cannot transmit an UPDATE-VERSION message, as described above.

In step 754 (FIGS. 3 and 7), speaker 174a accepts that peer 172a will re-advertise the routing information to speaker 174a.

In an embodiment, speaker 174a can send a BGP OPEN message to peer 172a that comprises an indication of the GR capabilities. To that message, peer 172a may respond with its own BGP OPEN message to acknowledge restart of the communication session with speaker 174a.

In an embodiment, recognizing GR, but not EGR, capability of speaker 174a, peer 172a can re-advertise routing information to speaker 174a, assuming that none of the previously received and acknowledged routes survived the restart of speaker 174a. For example, peer 172a can send one or more advertisements 424 comprising routing information for an AFI/SAFI.

In an embodiment, upon receiving one or more advertisements 424, speaker 174a can acknowledge a receipt of the advertisements 424 to peer 172a by sending an acknowledgment message 426.

Referring to FIG. 7, if in step 402, speaker 174a determined that the last acknowledged version of routing information for an AFI/SAFI has not been preserved after the restart of speaker 174a, or that state information corresponding to routing information sent to peer 172a has not been preserved, then speaker 174a proceeded to step 755, in which speaker 174a determines whether the EGR capability are recognized by peer 172a.

In step 755, if speaker 174a determined that peer 172a does not recognize the EGR capability, then speaker 174a proceeds to step 754, which was described in detail in FIG. 3, above.

However, if in step 755, speaker determined that peer 172a does recognize the EGR capability, then speaker 174a proceeds to step 756, in which speaker 174a requests last acknowledged routing information from peer 172a, and which is described in detail in FIG. 4 below.

Figure 4:
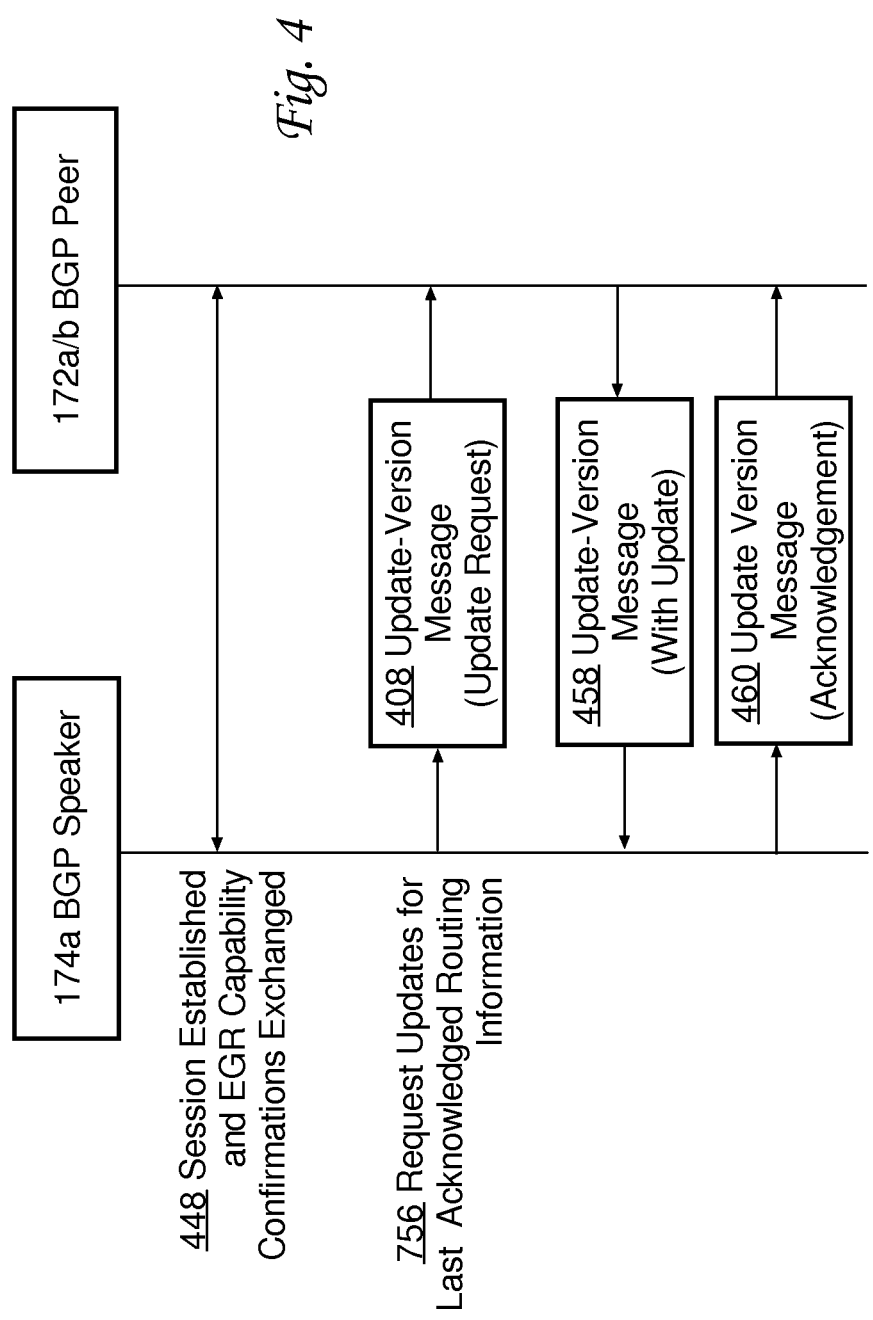
FIG. 4 illustrates an embodiment of implementing enhanced graceful restart capabilities in BGP speakers.

Step 756 is described in both FIGS. 7 and 4.

FIG. 4, which illustrates an embodiment of implementing enhanced graceful restart capabilities in a BGP speaker 174a and peer 172a. In FIG. 4, in step 448, a communication session between speaker 174a and peer 172a has been already established and speaker 174a and peer 172a communicated to each other that they both support the EGR capability.

In an embodiment, during the lifetime of an established session, if needed, speaker 174a can use an UPDATE-VERSION message 408 to request updates from the last update version that was previously acknowledged as long as speaker 174a has received an indication that peer 172a supports the EGR capabilities.

In step 756 (FIGS. 4 and 7), speaker 174a generates a request for updates from the last, previously acknowledged update version. The request can be communicated as an UPDATE-VERSION message having the message subtype filed set to value 3. The value 3 indicates that speaker 174a requests the updates from the last acknowledged update version. In this type of the UPDATE-VERSION message, a version field of the UPDATE-VERSION message is irrelevant because the request is for the updates from the last acknowledged update version, and not any particular version of routing information.

When peer 172a receives such a request, it can send an UPDATE-VERSION message 458 comprising update routing information from the last acknowledged version that speaker 174a has recorded.

In response to successful receiving an UPDATE-VERSION message 458 comprising the routing information, speaker 174a can generate and transmit an UPDATE-VERSION acknowledgement message 460.

However, if speaker 174a is unable to acknowledge a receipt of the UPDATE VERSION message 458 for some reason (for example, when speaker 174a is a slow peer), then speaker 174a can perform an enhanced route refresh process if possible. Alternatively, speaker 174a can simply log an error message and continue with a complete re-announcement of the routing information.

7.0 Error Handling

In an embodiment, NOTIFICATION error codes related to EGR may comprise:

| Error Code | Symbolic Name |
|---|---|
| TBD | UPDATE-VERSION Message Error |

The following error sub codes may be defined:

| Sub code | Symbolic Name |
|---|---|
| 1 | Invalid Message Length |
| 2 | Invalid Message Subtype |

If a speaker detects an error while processing an UPDATE-VERSION message, the speaker can send a NOTIFICATION message with Error Code UPDATE-VERSION Message Error. The Data field of the NOTIFICATION message can contain the complete UPDATE-VERSION message.

If the Length field for the UPDATE-VERSION message is incorrect, then the error sub code is set to "Invalid Message Length."

If the Message Subtype in the UPDATE-VERSION message is not any of the defined value, then the error sub code is set to "Invalid Message Subtype."

8.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
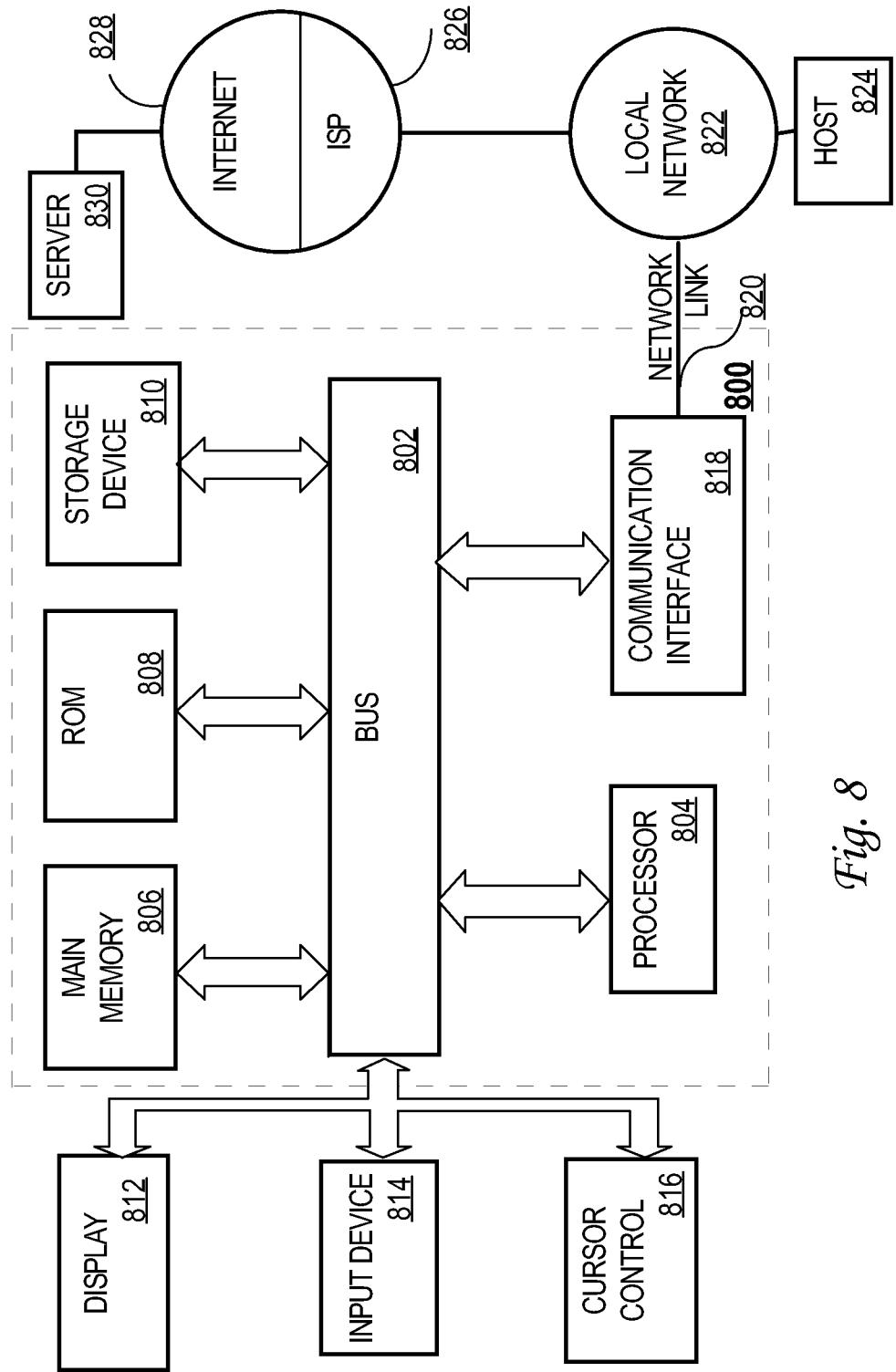
FIG. 8 illustrates an embodiment of communications between network devices in a network.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9.0 Extensions and Alternatives

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method comprising:

at a restarting node:

creating and storing in a repository a last acknowledged routing version information indicator and a preserved routing version information indicator;

wherein the preserved routing version information indicator specifies a version of the routing information that has been received and acknowledged by the restarting node, and preserved by the restarting node after a session restart;

determining that a session restart on the restarting node has been initiated;

in response to determining that the restarting node has preserved the last acknowledged version of routing information received from a peer node, and determining that the restarting node has preserved a routing state corresponding to the last acknowledged version of routing information, transmitting to the peer node a message indicating that the last acknowledged version of routing information and the routing state have been preserved at the restarting node;

wherein determining that the restarting node has preserved the last acknowledged version of routing information comprises determining that the last acknowledged routing version information indicator and the preserved routing version information indicator are the same;

wherein the method is performed by one or more computing devices.

2. The method of claim 1, further comprising, in response to determining that the restarting node has not preserved the last acknowledged version of routing information, transmitting to the peer node an update-requesting message indicating a particular version of routing information requested by the restarting node from the peer node.

3. The method of claim 1, further comprising, in response to receiving an updated version of routing information from the peer node, updating a version number associated with the update version of routing information.

4. The method of claim 1, further comprising using an update version Border Gateway Protocol (BGP) message for checkpointing the updated version of routing information received from the peer node and maintained by the restarting node.

5. The method of claim 1, further comprising, in response to determining that the peer node has not preserved a particular version of routing information, setting a timer, and testing whether a confirmation of receiving the particular version of routing information by the peer node is received before expiration of the timer; wherein the restarting node and the peer node are internetworking devices that host Border Gateway Protocol (BGP).

6. A non-transitory computer storage media storing instructions which, when executed by one or more processors, cause the one or more processors to perform:

at a restarting node:

creating and storing in a repository a last acknowledged routing version information indicator and a preserved routing version information indicator;

wherein the preserved routing version information indicator specifies a version of the routing information that has been received and acknowledged by the restarting node, and preserved by the restarting node after a session restart;

determining that a session restart on the restarting node has been initiated;

in response to determining that the restarting node has preserved the last acknowledged version of routing information received from a peer node, and determining that the restarting node has preserved a routing state corresponding to the last acknowledged version of routing information, transmitting to the peer node a message indicating that the last acknowledged version of routing information and the routing state have been preserved at the restarting node;

wherein determining that the restarting node has preserved the last acknowledged version of routing information comprises determining that the last acknowledged routing version information indicator and the preserved routing version information indicator are the same.

7. The non-transitory computer readable storage medium of claim 6, further comprising instructions which, when executed by one or more processors, cause the one or more processors to perform: in response to determining that the restarting node has not preserved the last acknowledged version of routing information, transmitting to the peer node an update-requesting message indicating a particular version of routing information requested by the restarting node from the peer node.

8. The non-transitory computer readable storage medium of claim 6, further comprising instructions, which when executed by the one or more processors, cause the one or more processors to perform: in response to receiving an updated version of routing information from the peer node, updating a version number associated with the update version of routing information.

9. The non-transitory computer readable storage medium of claim 6, further comprising instructions which, when executed by the one or more processors, cause the one or more processors to perform using an update version Border Gateway Protocol (BGP) message for checkpointing the updated version of routing information received from the peer node and maintained by the restarting node.

10. The non-transitory computer readable storage medium of claim 6, further comprising instructions which, when executed by the one or more processors, cause the one or more processors to perform: in response to determining that the peer node has not preserved a particular version of routing information, setting a timer, and testing whether a confirmation of receiving the particular version of routing information by the peer node is received before expiration of the timer; wherein the restarting node and the peer node are internetworking devices that host Border Gateway Protocol (BGP).

11. A method comprising:

creating and storing in a repository a last acknowledged routing version information indicator and a preserved routing version information indicator;

wherein the preserved routing version information indicator specifies a version of the routing information that has been received and acknowledged by the restarting node, and preserved by the restarting node after a session restart;

receiving a message indicating that a restarting node supports an enhanced graceful restart capability but has not preserved the last acknowledged version of routing information received from a peer node;

wherein the restarting node has not preserved the last acknowledged version of routing information if the restarting node determined that the last acknowledged routing version information indicator is different than the preserved routing version information indicator;

in response to receiving the message, re-advertising the last acknowledged version of routing information to the restarting node;

wherein the method is performed by one or more special-purpose computing devices.

12. The method of claim 11, further comprising, in response to determining that an updated version of routing information is available for advertising to the restarting node, increasing a version number associated with updates for the restarting node, and advertising the updated version of routing information to the restarting node.

13. The method of claim 12, further comprising, in response to determining that the restarting node has not acknowledged receipt of the updated version of routing information before expiration of a timer, repeating advertising of the updated version of routing information to the restarting node.

14. The method of claim 11, further comprising, in response to receiving an updated version of routing information from a third node, updating the version number associated with updates for the restarting node, and advertising the updated version of routing information to the restarting node; wherein the restarting node and the peer node are internetworking devices that host Border Gateway Protocol (BGP).

15. A non-transitory computer readable storage medium, storing instructions which, when executed by one or more processors, cause the one or more processors to perform:
- creating and storing in a repository a last acknowledged routing version information indicator and a preserved routing version information indicator;
- wherein the preserved routing version information indicator specifies a version of the routing information that has been received and acknowledged by the restarting node, and preserved by the restarting node after a session restart;
- receiving a message indicating that a restarting node supports an enhanced graceful restart capability but has not preserved the last acknowledged version of routing information received from a peer node;
- wherein the restarting node has not preserved the last acknowledged version of routing information if the restarting node determined that the last acknowledged routing version information indicator is different than the preserved routing version information indicator;
- in response to receiving the message, re-advertising the last acknowledged version of routing information to the restarting node.

16. The non-transitory computer readable storage medium of claim 15, further comprising instructions which, when executed by the one or more processors, cause the one or more processors to perform: in response to determining that an updated version of routing information is available for advertising to the restarting node, increasing a version number associated with updates for the restarting node, and advertising the updated version of routing information to the restarting node.

17. The non-transitory computer readable storage medium of claim 16, further comprising instructions which, when executed by the one or more processors, cause the one or more processors to perform: in response to determining that the restarting node has not acknowledged receipt of the updated version of routing information before expiration of a timer, repeating advertising of the updated version of routing information to the restarting node.

18. The non-transitory computer readable storage medium of claim 15, further comprising instructions which, when executed by the one or more processors, cause the one or more processors to perform: in response to receiving an updated version of routing information from a third node, updating the version number associated with updates for the restarting node, and advertising the updated version of routing information to the restarting node; wherein the restarting node and the peer node are internetworking devices that host Border Gateway Protocol (BGP).

* * * * *